(12) United States Patent
Liu

(10) Patent No.: US 10,988,088 B1
(45) Date of Patent: Apr. 27, 2021

(54) VEHICLE BIKE RACK WITH FRONT WHEEL CLAMP

(71) Applicant: Cheh-Kang Liu, Taipei (TW)

(72) Inventor: Cheh-Kang Liu, Taipei (TW)

( * ) Notice: Subject to any disclaimer, the term of this patent is extended or adjusted under 35 U.S.C. 154(b) by 0 days.

(21) Appl. No.: 16/860,264

(22) Filed: Apr. 28, 2020

(51) Int. Cl.
    *B60R 9/10*     (2006.01)

(52) U.S. Cl.
    CPC ..................... *B60R 9/10* (2013.01)

(58) Field of Classification Search
    CPC ... B60R 9/10; B60R 9/06; B60R 9/048; Y10S 224/924
    See application file for complete search history.

(56) References Cited

U.S. PATENT DOCUMENTS

| | | | | |
|---|---|---|---|---|
| 5,190,195 A * | 3/1993 | Fullhart | ................. | B60R 9/10 224/497 |
| 5,454,496 A * | 10/1995 | Sumida, Jr. | ............. | B60D 1/42 224/509 |
| 5,579,972 A * | 12/1996 | Despain | ................. | B60R 9/10 224/506 |
| 6,644,525 B1 * | 11/2003 | Allen | .................... | B60R 9/06 224/282 |
| 6,988,645 B1 * | 1/2006 | Nusbaum | ............ | B60R 9/048 224/324 |
| 7,055,725 B1 * | 6/2006 | Kolda | ................... | B60R 9/06 224/497 |
| 7,419,076 B1 * | 9/2008 | Grothues | .............. | B60R 9/08 114/343 |
| 8,444,032 B2 * | 5/2013 | Pedrini | ................. | B60R 9/06 224/314 |
| 8,490,847 B2 * | 7/2013 | Sautter | ................. | B60R 9/10 224/497 |
| 8,556,144 B2 * | 10/2013 | Liu | ....................... | B60R 9/08 224/497 |
| 9,242,609 B2 * | 1/2016 | Wang | .................... | B60R 9/10 |
| 9,376,063 B2 * | 6/2016 | Hein | ..................... | B60R 9/06 |
| D797,001 S * | 9/2017 | Liu | ....................... | D12/106 |
| 2007/0251964 A1 * | 11/2007 | Gunn | ................... | B60R 9/10 224/504 |
| 2009/0230162 A1 * | 9/2009 | Wang | .................... | B60R 9/10 224/519 |
| 2009/0302078 A1 * | 12/2009 | Wang | .................... | B60R 9/10 224/502 |
| 2010/0096424 A1 * | 4/2010 | Kuschmeader | ...... | B60R 9/10 224/509 |
| 2010/0230455 A1 * | 9/2010 | Wang | .................... | B60R 9/10 224/533 |

(Continued)

*Primary Examiner* — Brian D Nash
(74) *Attorney, Agent, or Firm* — Demian K. Jackson; Jackson IPG PLLC

(57) ABSTRACT

A vehicle bike rack formed of a connection tube, a main support tube and a U-shaped frame is disclosed to include an upper mounting block mounted on the U-shaped frame, a lower mounting block movably connected to the upper mounting block, a front wheel clamp connected to the lower mounting block and a third locking device for locking the front wheel clamp to the front wheel of the bike. The front wheel clamp includes a mounting rod connected to the lower mounting block, and a U-shaped clamping plate provided at one end of the mounting rod and attached to the front wheel of the bike and locked thereto by the third locking device to prohibit the front wheel of the bike from vibration as the vehicle carrying the vehicle bike rack and the bike is running.

4 Claims, 13 Drawing Sheets

(56) References Cited

U.S. PATENT DOCUMENTS

| | | | | |
|---|---|---|---|---|
| 2011/0068138 A1* | 3/2011 | Flaherty | ............... | B60R 9/06 224/324 |
| 2011/0068140 A1* | 3/2011 | Stevens | ............... | B60R 9/10 224/533 |
| 2011/0132946 A1* | 6/2011 | Sautter | ............... | B60R 9/10 224/324 |
| 2011/0139844 A1* | 6/2011 | Sautter | ............... | B60R 9/06 224/488 |
| 2012/0000953 A1* | 1/2012 | Huang | ............... | B60R 9/10 224/539 |
| 2012/0205414 A1* | 8/2012 | Bogoslofski | ............ | B60R 9/06 224/534 |
| 2013/0243518 A1* | 9/2013 | Wiedemann | ............ | B60R 9/10 403/66 |
| 2014/0027484 A1* | 1/2014 | Loken | ............... | B60R 9/10 224/497 |
| 2014/0151421 A1* | 6/2014 | Loken | ............... | B60R 9/10 224/519 |
| 2014/0246467 A1* | 9/2014 | Hein | ............... | B60R 9/10 224/519 |
| 2015/0231780 A1* | 8/2015 | Hirokawa | ............ | F16M 11/04 224/518 |
| 2017/0203699 A1* | 7/2017 | Williams | ............... | B60R 9/06 |
| 2017/0253188 A1* | 9/2017 | Shen | ............... | B60R 9/10 |
| 2019/0016270 A1* | 1/2019 | Nordstrom | ............ | B60R 9/10 |
| 2019/0016271 A1* | 1/2019 | Garceau | ............... | B60R 9/06 |
| 2020/0156724 A1* | 5/2020 | Kuschmeader | ......... | B60R 9/10 |
| 2020/0406825 A1* | 12/2020 | Wang | ............... | B60R 9/048 |

\* cited by examiner

US 10,988,088 B1

VEHICLE BIKE RACK WITH FRONT WHEEL CLAMP

BACKGROUND OF THE INVENTION

1. Field of the Invention

The present invention relates to vehicle bike rack technology and more particularly, to a vehicle bike rack with a front wheel clamp, which can lock the front wheel of the bike mounted thereof, preventing bike coating damage during running of the vehicle carrying the vehicle bike rack and the bike.

2. Description of the Related Art

Conventional vehicle racks are more complicated in structure and more complicated to assemble. FIG. 1 illustrates a vehicle bike rack 9 according to the prior art. According to this prior art design, the vehicle bike rack 9 comprises a connection tube 94 provided at a bottom side thereof for fastening to a vehicle, a U-shaped frame 9 provided at a top side thereof, and pairs of bike frame mounting blocks 91,92 located on the U-shaped frame 9 for supporting the bike frame of a bike, and locking devices 93 respectively provided at the bike frame mounting blocks 91,92 for locking the bike frame of the bike to the bike frame mounting blocks 91,92. However, when the vehicle carrying the vehicle bike rack 9 and the bike is running over an uneven rod surface, the front wheel of the bike may be forced to oscillate, making noises or even causing bike causing damage.

SUMMARY OF THE INVENTION

The present invention has been accomplished under the circumstances in view. It is the main object of the present invention to provide a vehicle bike rack with front wheel clamp, which provides a front wheel clamp matching with a third locking device to prohibit the front wheel of the bike from vibration as the vehicle carrying the bike is running, preventing bike coating damage.

It is another object of the present invention to provide a vehicle bike rack with front wheel clamp, which allows forward and backward adjustment as well as angular adjustment of the mounting rod of the front wheel clamp so that the front wheel clamp fits the front wheel of different sizes of bikes.

DETAILED DESCRIPTION OF THE INVENTION

Figure 9:
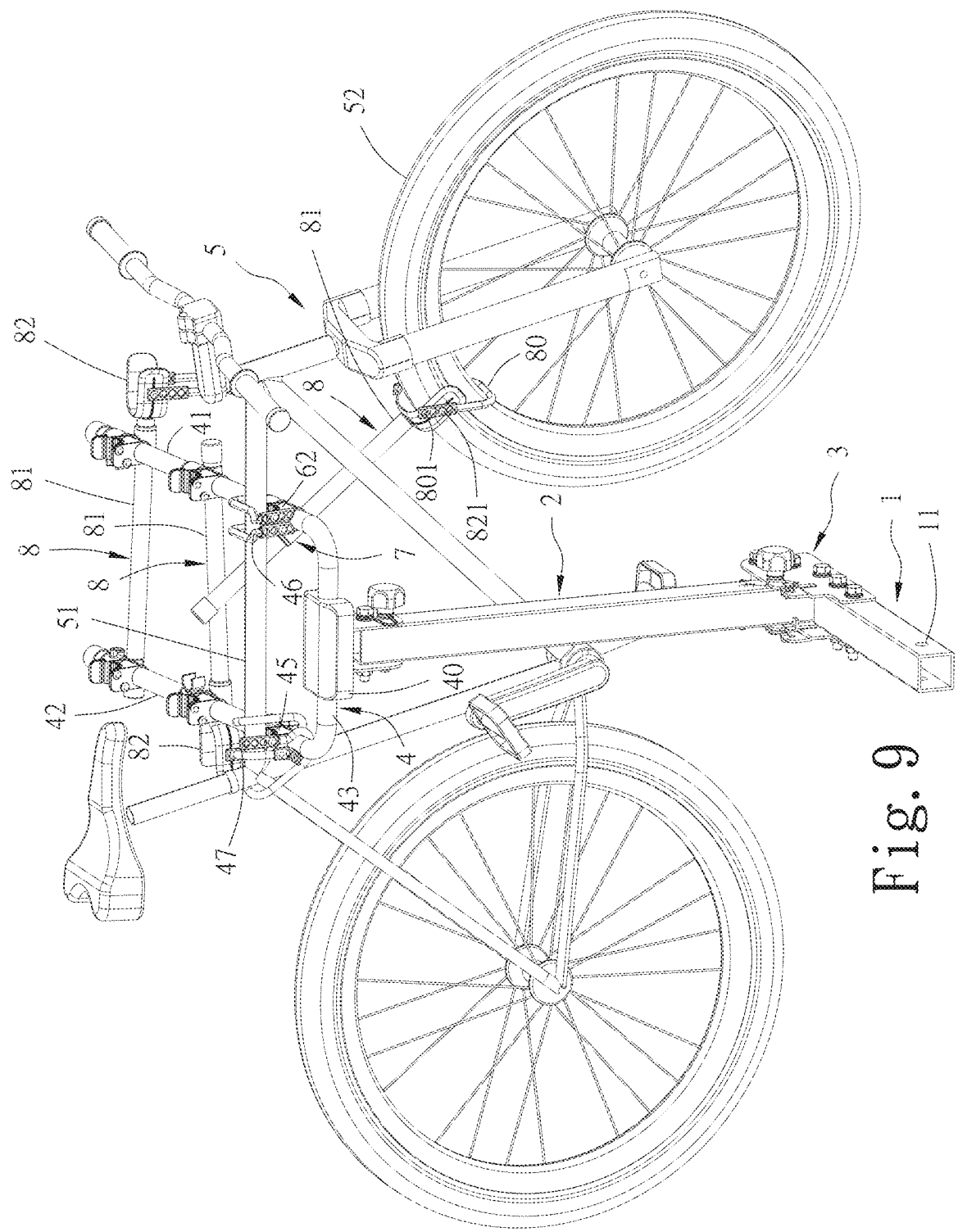
FIG. 9 is an applied view of the present invention.

Referring to FIGS. 2-8, a vehicle bike rack with front wheel clamp in accordance with the present invention comprises:

a connection tube 1 provided with at least one mounting hole 11 for fastening to a connection bar (not shown) of a vehicle by at least one lock pin (not shown);

a main support tube 2 having a bottom end thereof connected to a rear end of the connection tube 1 by a mounting bracket 3; and a U-shaped frame 4 comprising a first longitudinal rod 41, a second longitudinal rod 42, a transverse rod 43 connected between one end of the first longitudinal rod 41 and one end of the second longitudinal rod 42, a connector 4 connecting the transverse rod 43 to an opposing top end of the main support tube 2, at least one first bike frame mounting block 44 mounted on the first longitudinal rod 41, at least one second bike frame mounting block 45 mounted on the second longitudinal rod 42, and at least one first locking device 46 and at least one second locking device 47 for locking the at least one first bike frame mounting block 44 and the at least one second bike frame mounting block 45 to the bike frame 51 of a bike 5 (see FIG. 9).

Figure 10:
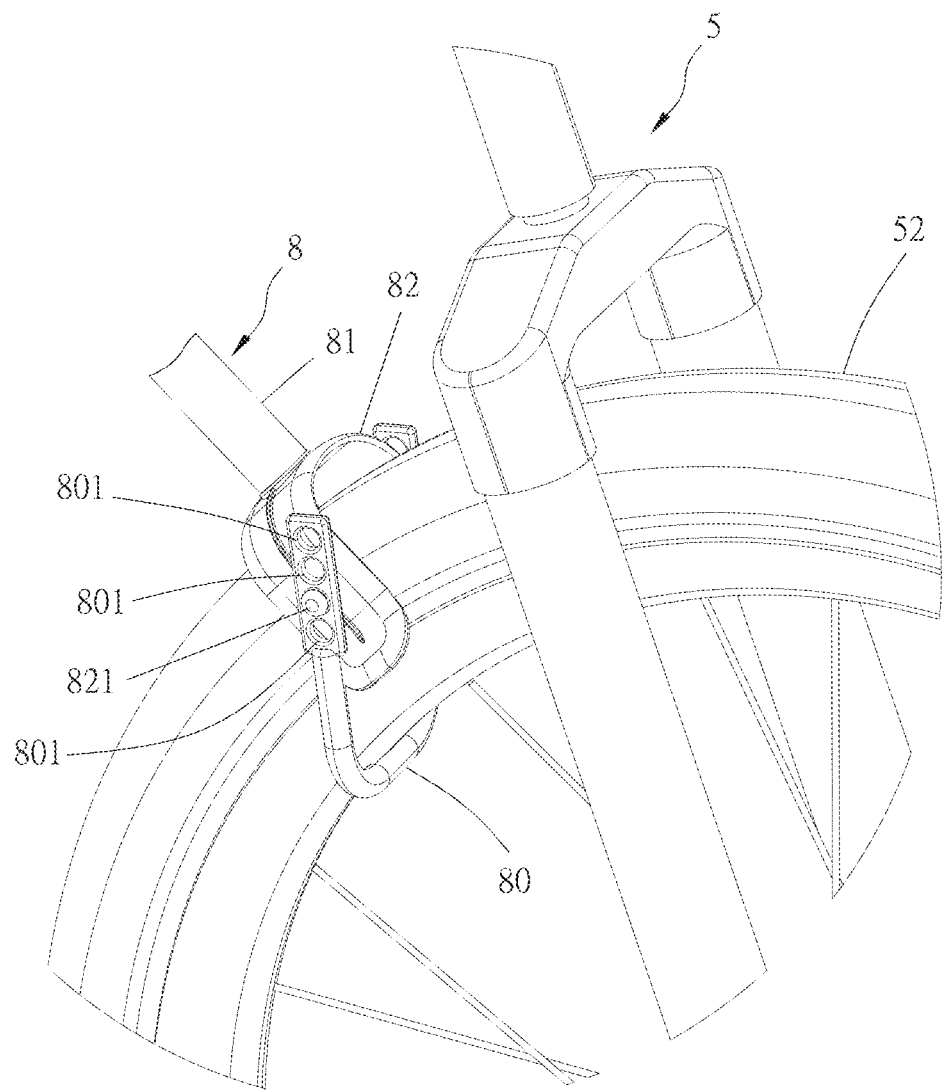
FIG. 10 is an enlarged view of a part of FIG. 9.

The main features of the vehicle bike rack are outlined hereinafter. The vehicle bike rack with front wheel clamp further comprises at least one upper mounting block 6 (see FIGS. 2-5 and FIGS. 7-8) selectively mounted on the first longitudinal rod 41 or second longitudinal rod 42 of the U-shaped frame 4, a lower mounting block 7 (see FIGS. 3-5 and FIG. 7) movably connected to one respective upper mounting block 6, a front wheel clamp 8 connected to one respective lower mounting block 7, and a third locking device 80 for locking one respective front wheel clamp 8 to the front wheel 52 of the bike 5 (see FIGS. 9 and 10). The front wheel clamp 8 comprises a mounting rod 81 (see FIGS. 3-7), and a U-shaped clamping plate 82 provided at one end of the mounting rod 81. In application, the U-shaped clamping plate 82 is attached to the front wheel 52 of the bike 5 and locked thereto by one respective third locking device 80 to prohibit the front wheel 52 of the bike 5 from vibration as the vehicle carrying the bike 5 is running.

Figure 1:
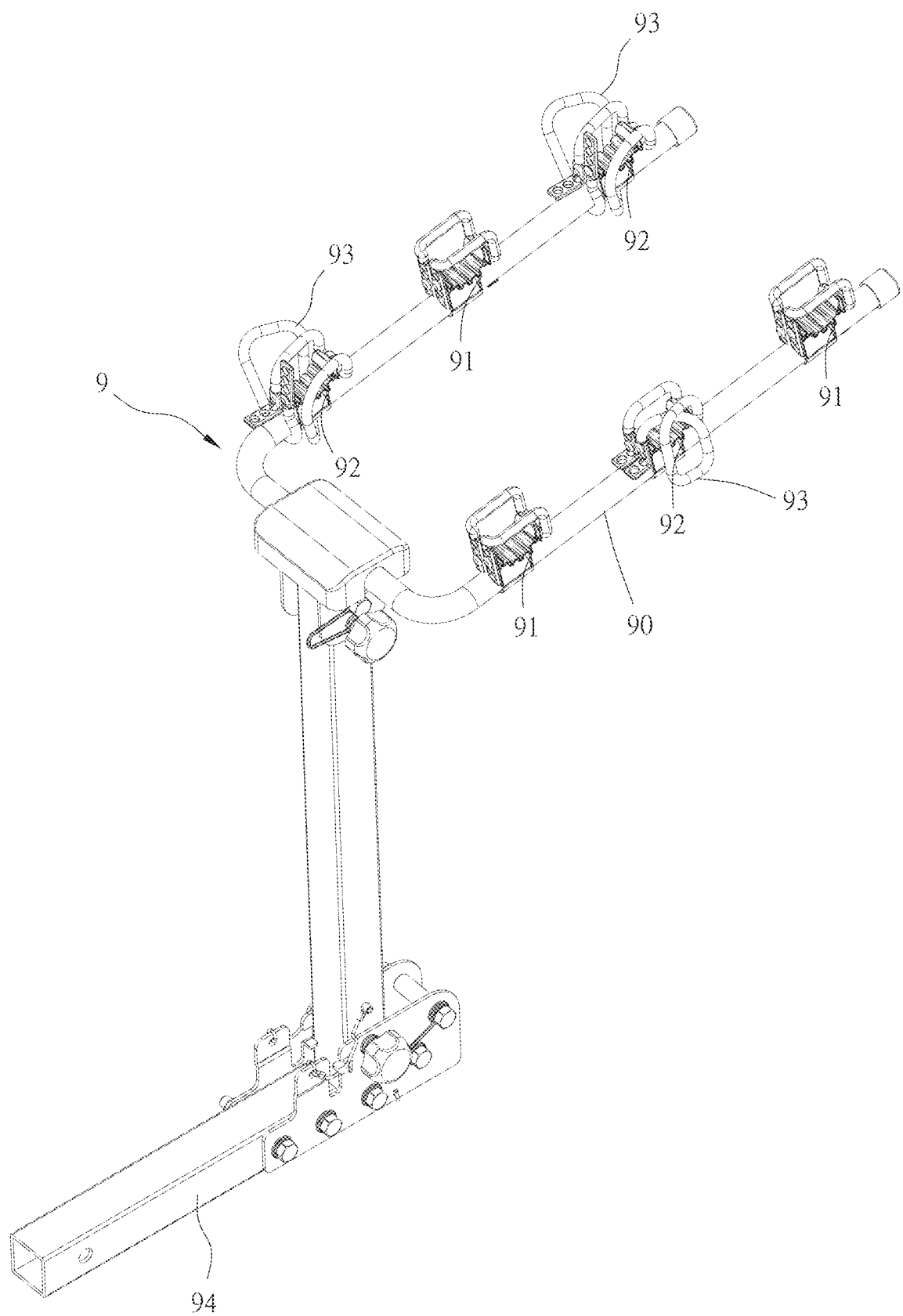
FIG. 1 is an elevational view of a vehicle bike rack according to the prior art.
Figure 2:
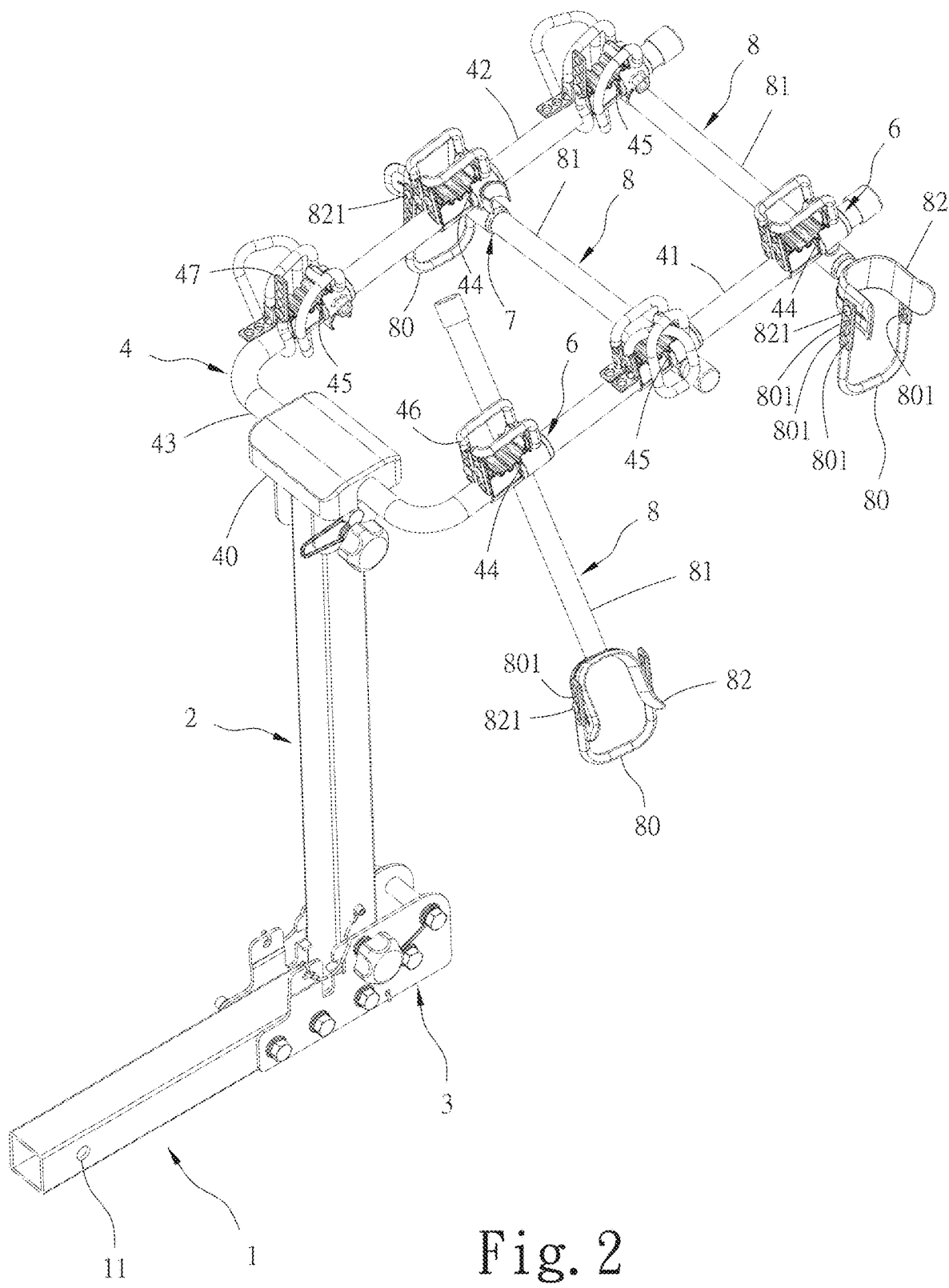
FIG. 2 is an elevational view of a vehicle bike rake with front wheel clamp in accordance with the present invention.
Figure 3:
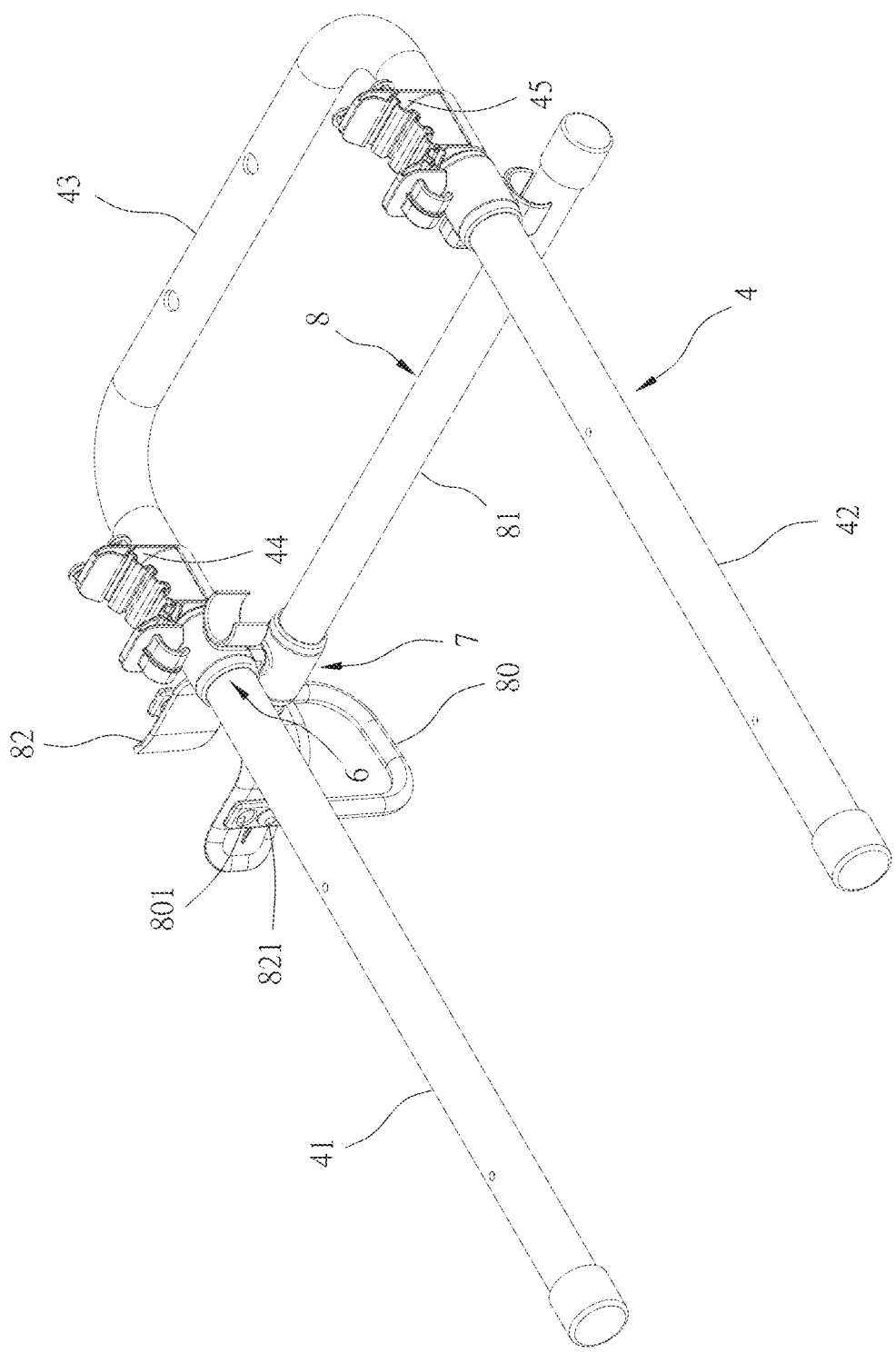
FIG. 3 is an enlarged view of a part of the vehicle bike rake with front wheel clamp shown in FIG. 2.
Figure 4:
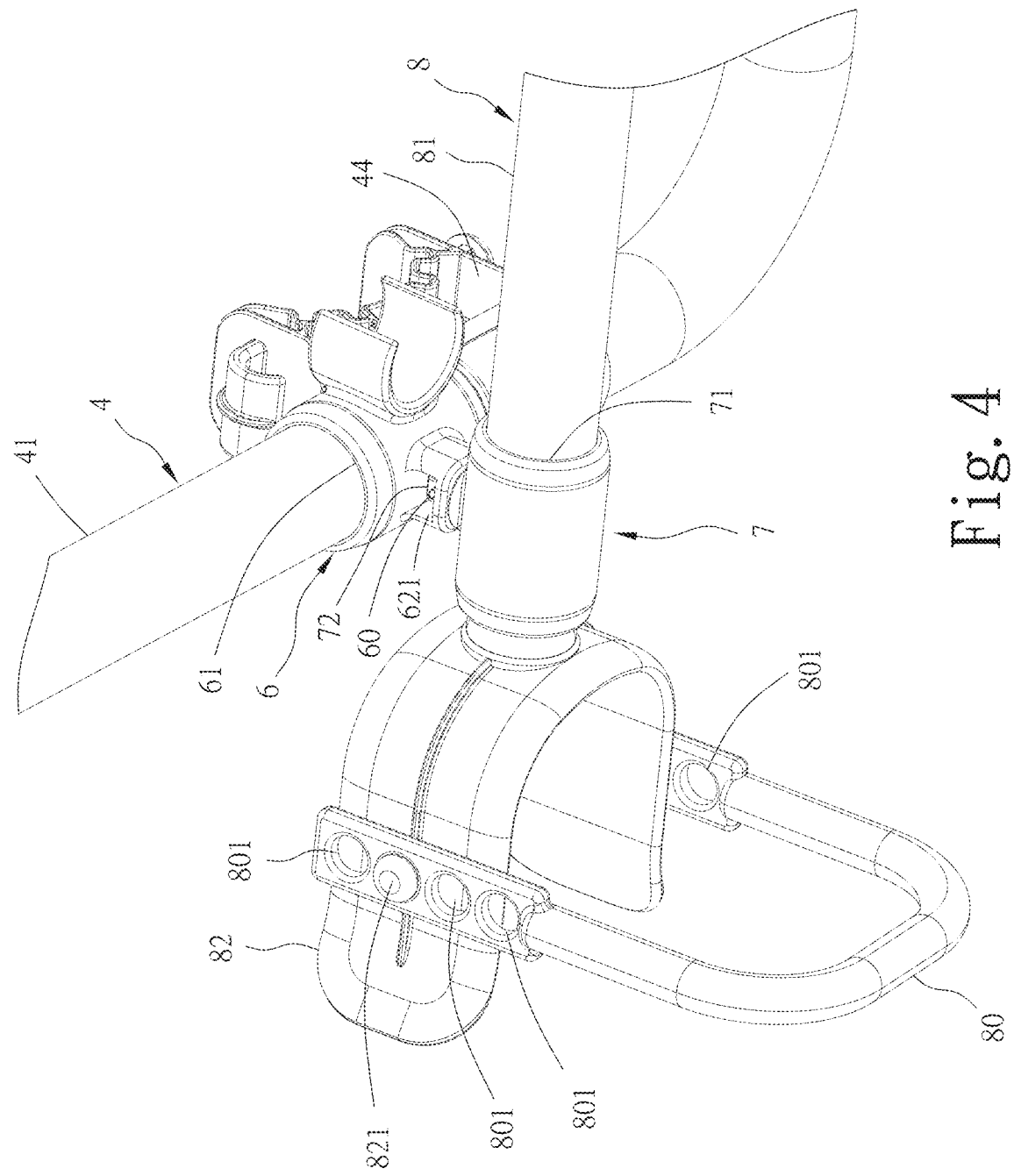
FIG. 4 is an enlarged view of a part of FIG. 3.
Figure 8:
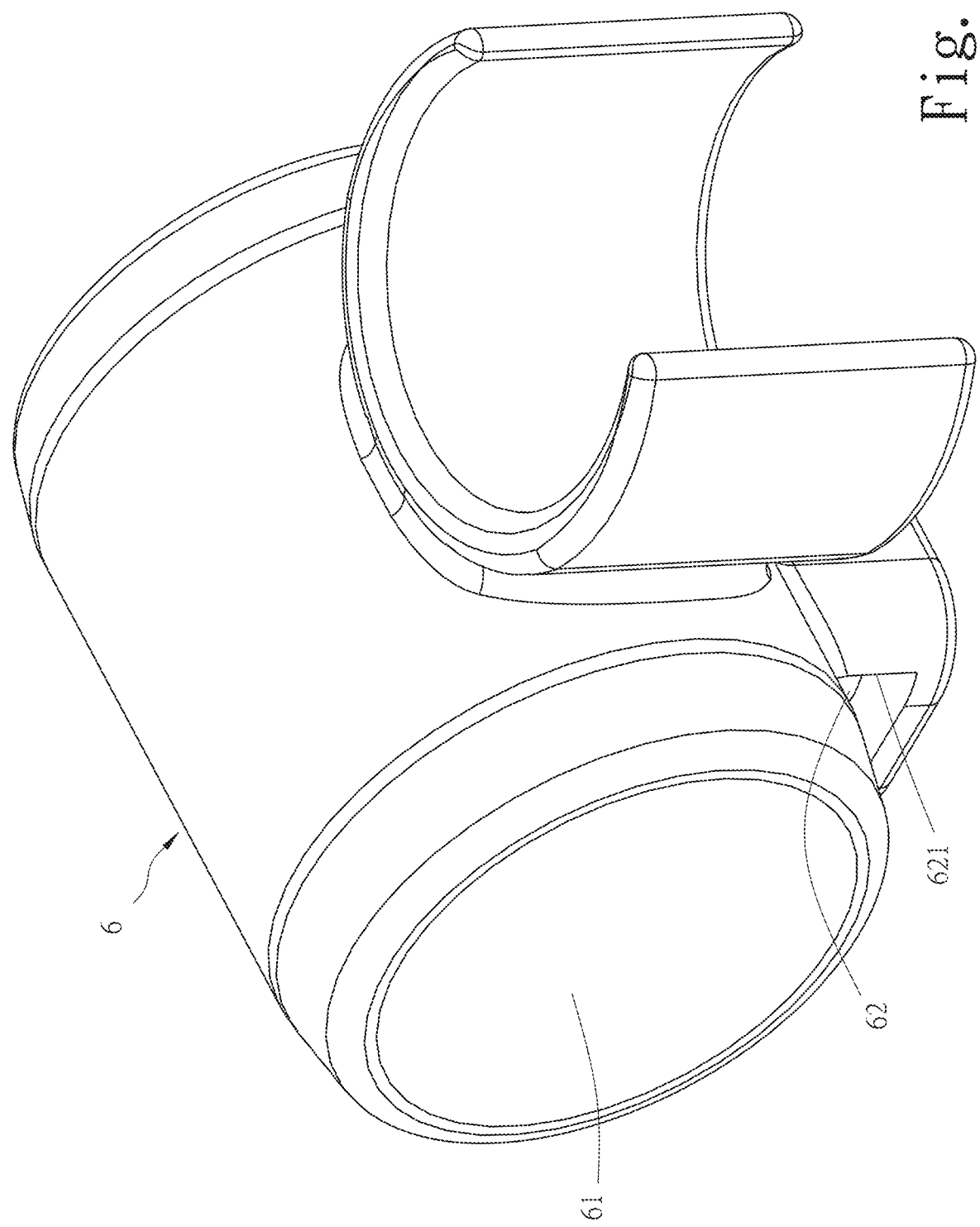
FIG. 8 is an enlarged view of the upper mounting block shown in FIG. 7.

Furthermore, the upper mounting block 6 has a transverse mounting hole 61 (see FIG. 5 and FIG. 7) attached onto the first longitudinal rod 41 or second longitudinal rod 42 of the U-shaped frame 4, a bottom pivot hole 62 (see FIGS. 7 and 8) located on a bottom side thereof, and a second transverse mounting hole 621 disposed in communication with the bottom pivot hole 62 (see FIG. 4 and FIG. 8). The lower mounting block 7 has a top pivot portion 72 (see FIGS. 4, 5 and 7) pivotally connected to the bottom pivot hole 62 (see FIGS. 7 and 8) by a pivot 60 (see FIGS. 4, 5 and 7) for allowing rotation of the lower mounting block 7 relative to the upper mounting block 6. The lower mounting block 7 further has an axial mounting hole 71 (see FIGS. 5 and 7) attached onto the mounting rod 81 of the front wheel clamp 8 for allowing the mounting rod 81 of the front wheel clamp 8 to be moved forward or backward relative to the lower mounting block 7.

Furthermore, the U-shaped clamping plate 82 of the front wheel clamp 8 (see FIGS. 2-7) has two pins 821 (see FIGS. 3-6) bilaterally protruded from an inner wall thereof and aimed at each other; the third locking device 80 is an elastic member made of thermos plastic rubber, thermos plastic urethane, natural rubber, silicone or ethylene propylene diene monomer, having two rows of mounting holes 801 symmetrically arranged at two opposite sides (see FIGS. 4 and 5) for the mounting of the pins 821 of the U-shaped clamping plate 82 of the front wheel clamp 8 selectively so that the third locking device 80 and the U-shaped clamping plate 82 of the front wheel clamp 8 can be positively locked to the front wheel 52 of the bike 5 (see FIGS. 9 and 10) to prohibit the front wheel 52 of the bike 5 from vibration as the vehicle carrying the bike 5 is running.

Figure 11:
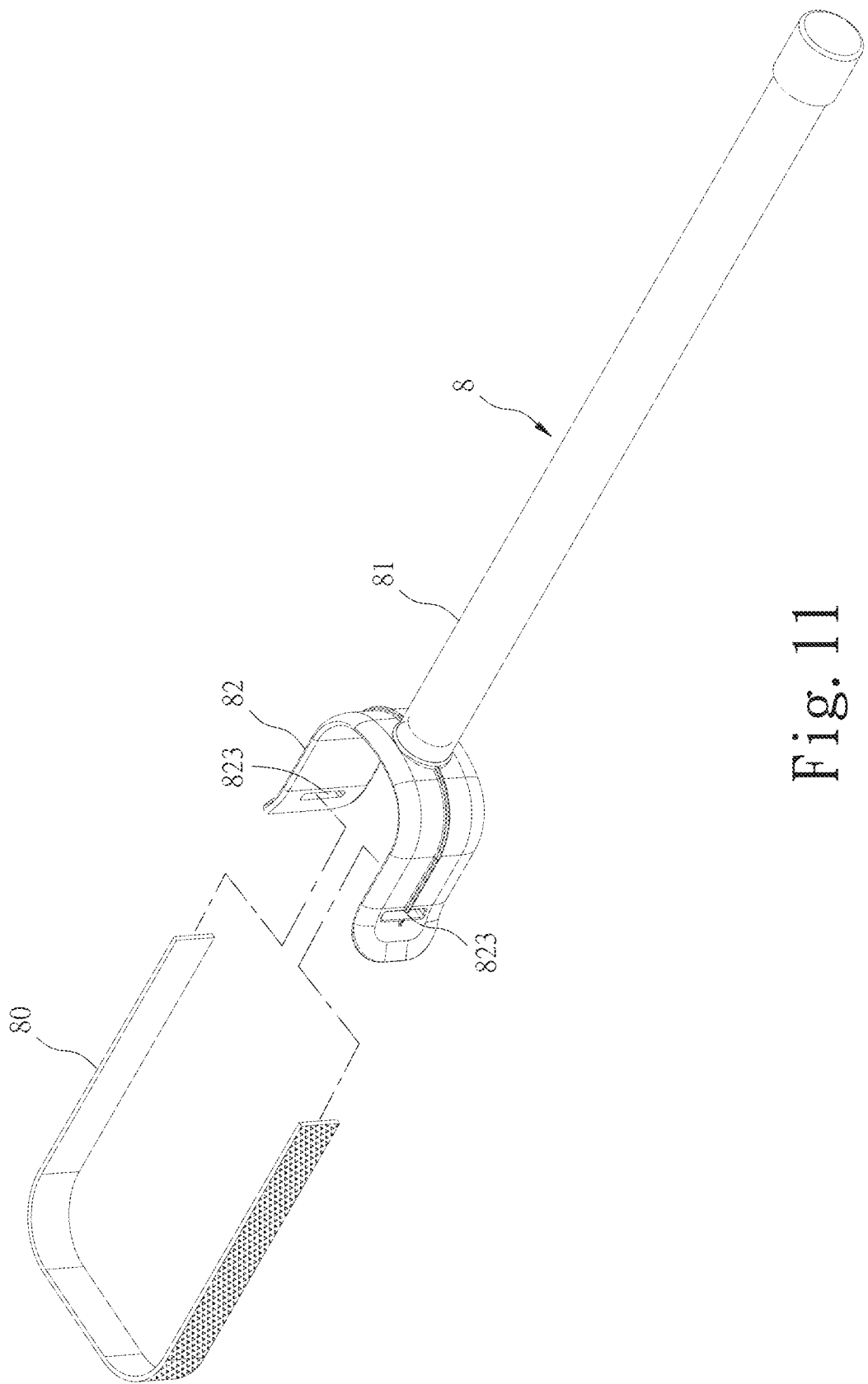
FIG. 11 is an exploded view of a part of an alternate form of the present invention, illustrating the U-shaped clamping plate of the front wheel clamp provided with insertion slots and the third locking device in the form of hook-and-loop fastener.
Figure 12:
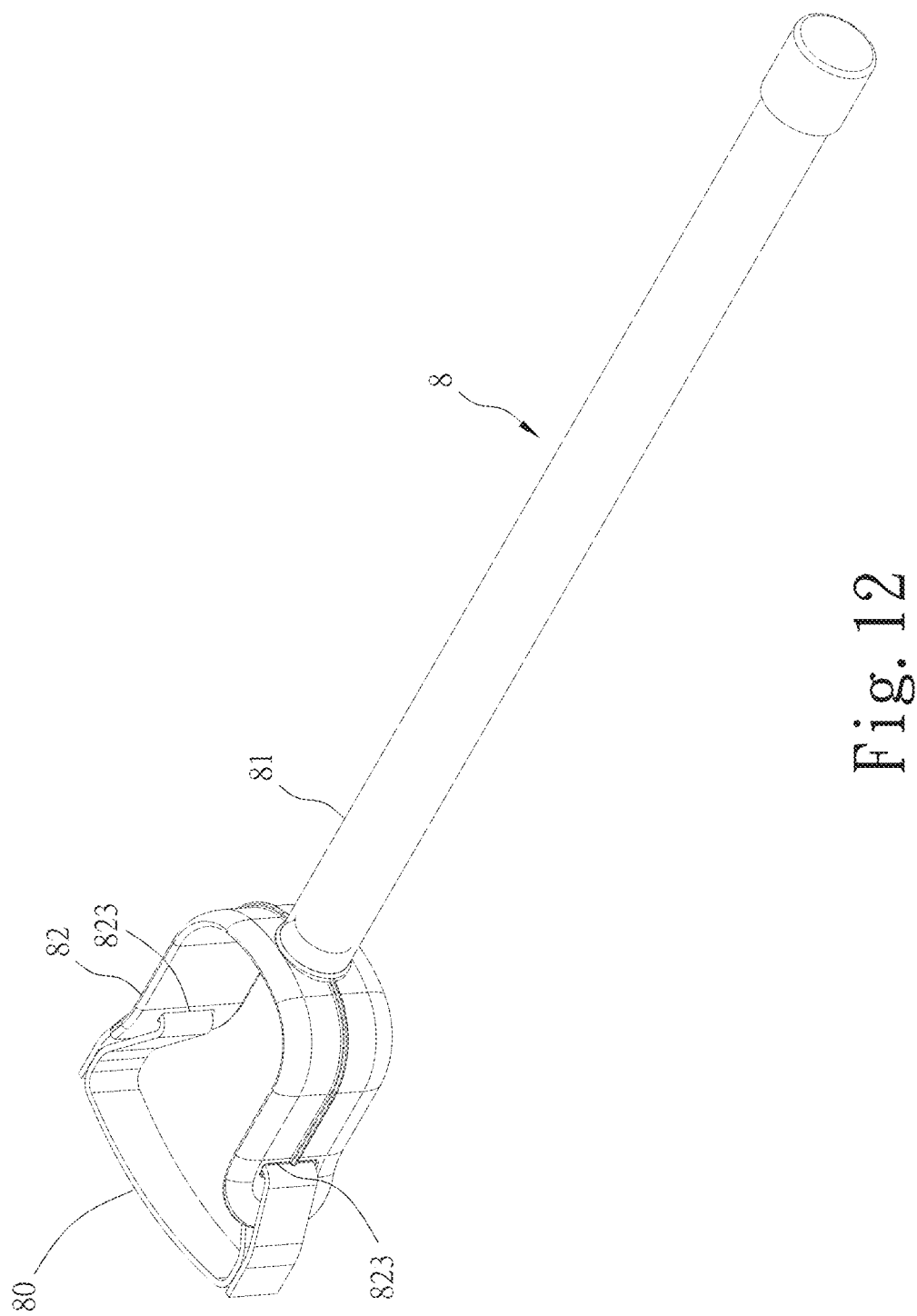
FIG. 12 is an assembly view of the components shown in FIG. 11.
Figure 13:
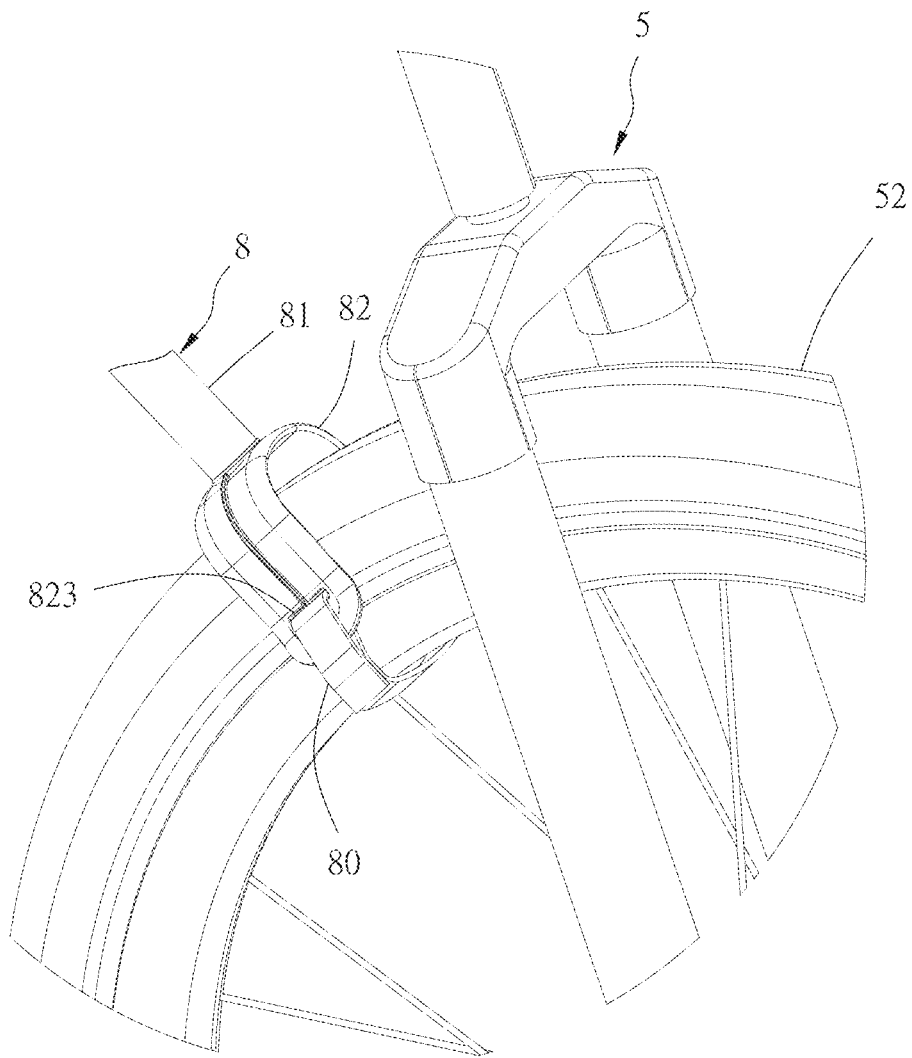
FIG. 13 is an applied view of the alternate form of the present invention, illustrating the U-shaped clamping plate of the front wheel clamp and the third locking device fastened to the front wheel of the bike.

Referring to FIGS. 11 and 12, in an alternate form of the present invention, the U-shaped clamping plate 82 of the front wheel clamp 8 has two insertion slots 823 symmetrically located on two opposite ends thereof; the third locking device 80 is a Velcro strap with hook and loop fastening materials. In application, the U-shaped clamping plate 82 of the front wheel clamp 8 is attached to the front wheel 52 of the bike 5, and then the third locking device 80 (hook-and-loop fastener) is inserted through the insertion slots 823 of the U-shaped clamping plate 82 and then fastened up (see FIG. 13) to lock the U-shaped clamping plate 82 of the front wheel clamp 8 to the front wheel 52 of the bike 5 (see FIG. 9).

Figure 5:
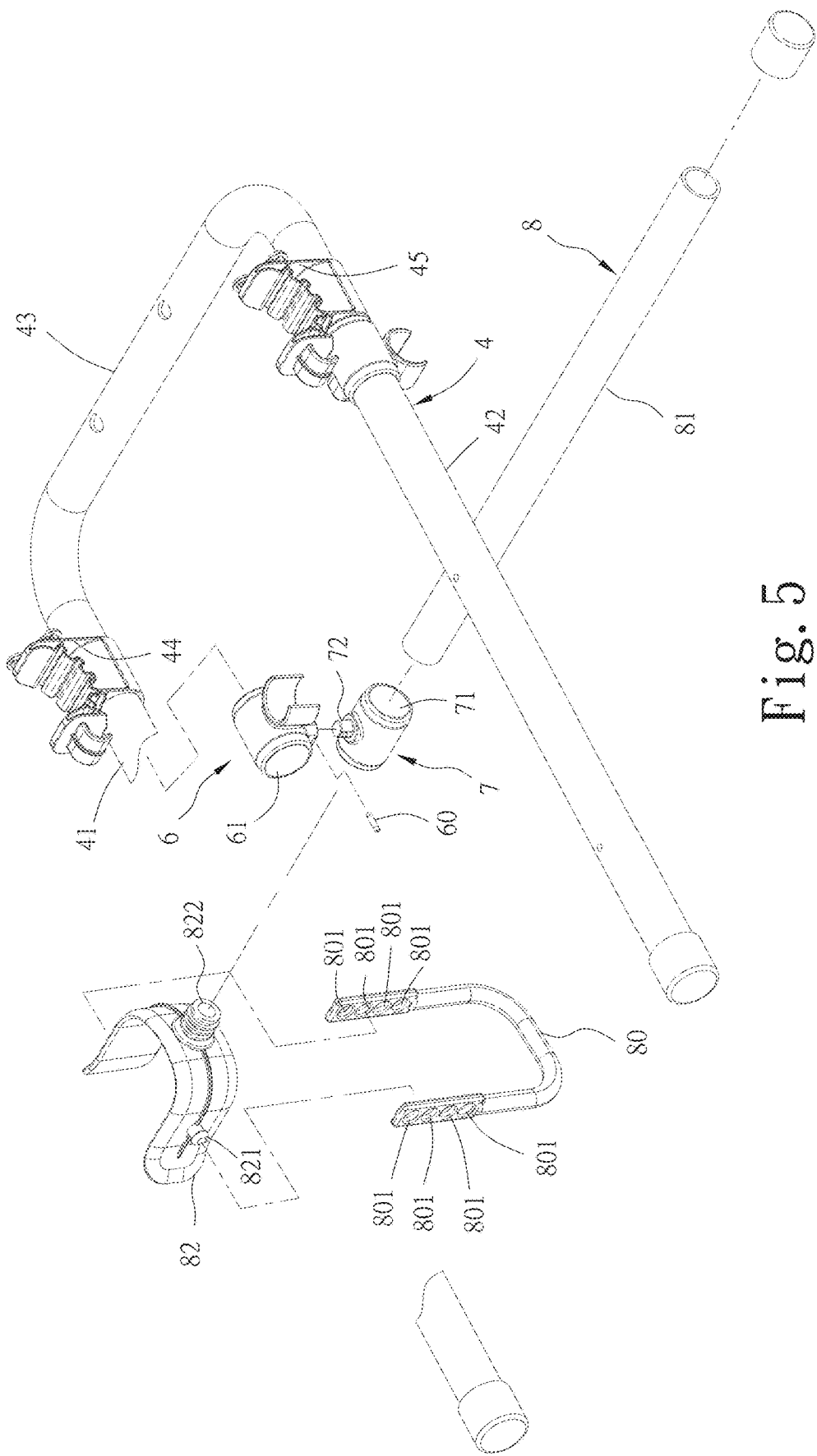
FIG. 5 is an exploded view of a part of FIG. 3.
Figure 6:
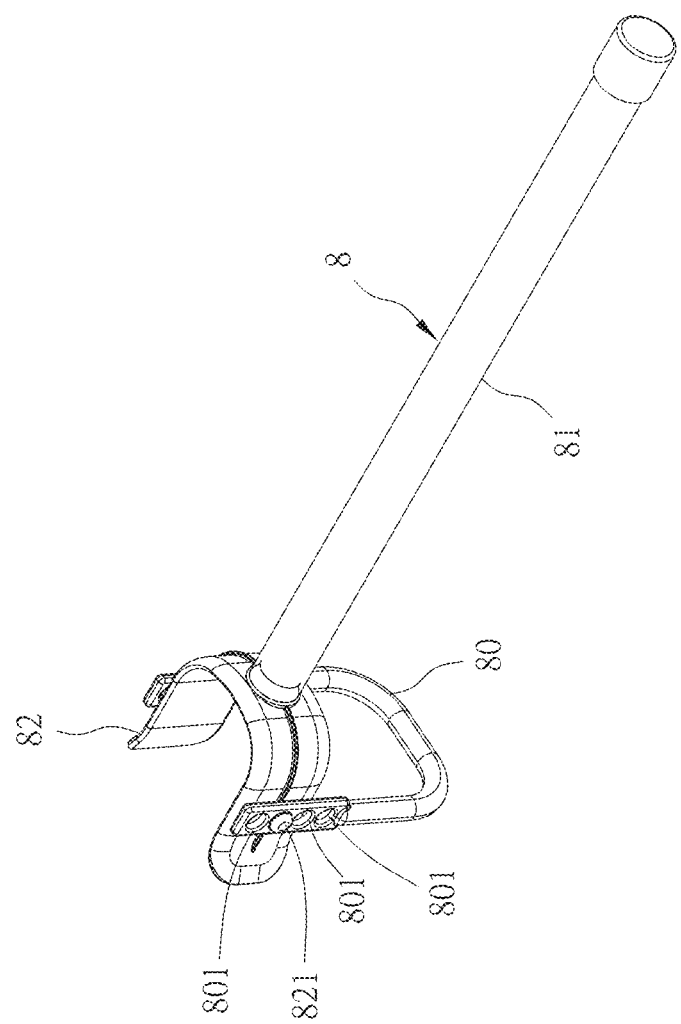
FIG. 6 is an elevational view of the front wheel clamp shown in FIG. 3.
Figure 7:
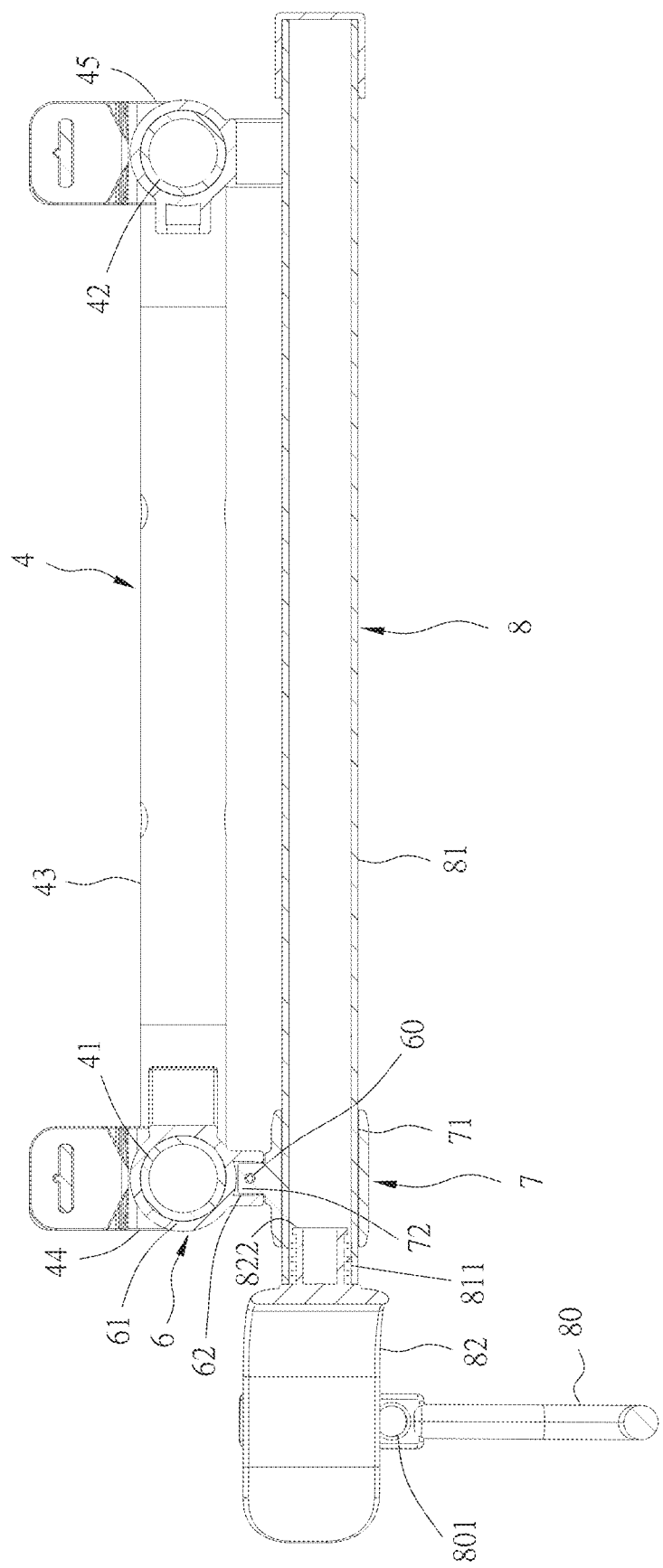
FIG. 7 is a sectional view of the component assembly shown in FIG. 3.

Furthermore, the U-shaped clamping plate 82 of the front wheel clamp 8 shown in FIGS. 3-7 has a connection portion 822 (see FIG. 5 and FIG. 7) press-fitted into a connection hole 811 of the mounting rod 81 (see FIG. 5). Alternatively, the U-shaped clamping plate 82 of the front wheel clamp 8 and the mounting rod 81 can be fastened together by a screw joint or any other connection measure.

In summary, the vehicle bike rack with front wheel clamp in accordance with the present invention can be summarized as having the following enhancement effects:

1. When the U-shaped clamping plate 82 of the front wheel clamp 8 is attached onto the front wheel 52 of the bike 5, it is locked to the front wheel 52 of the bike 5 by the third locking device 80 so that the vehicle bike mount can hold the bike 5 and lock the front wheel 52 of the bike 5, avoiding bike coating damage during running of the vehicle carrying the vehicle bike rack and the bike 5.

2. The mounting rod 81 of the front wheel clamp 8 can be moved forward or backward in the axial mounting hole 71 of the lower mounting block 7, and the lower mounting block 7 can be rotated with the front wheel clamp 8 relative to the upper mounting block 6 so that the vehicle bike rack can fit the front wheel 52 of different sizes of bikes 5.

What is claimed is:

1. A vehicle bike rack comprising:
   a connection tube provided with at least one mounting hole for fastening to a connection bar of a vehicle by at least one lock pin;
   a main support tube having a bottom end thereof connected to a rear end of said connection tube by a mounting bracket; and
   a U-shaped frame comprising a first longitudinal rod, a second longitudinal rod, a transverse rod connected between one end of said first longitudinal rod and one end of said second longitudinal rod, a connector connecting said transverse rod to an opposing top end of said main support tube, at least one first bike frame mounting block mounted on said first longitudinal rod, at least one second bike frame mounting block mounted on said second longitudinal rod, and at least one first locking device and at least one second locking device for locking said at least one first bike frame mounting block and said at least one second bike frame mounting block to the bike frame of a bike;
   wherein said vehicle bike rack with front wheel clamp further comprises at least one upper mounting block selectively mounted on said first longitudinal rod or said second longitudinal rod of said U-shaped frame, a lower mounting block movably connected to one respective said upper mounting block, a front wheel clamp connected to one respective said lower mounting block and a third locking device for locking one respective said front wheel clamp to the front wheel of said bike, said front wheel clamp comprising a mounting rod connected to one respective said lower mounting block and a U-shaped clamping plate provided at one end of said mounting rod and attached to the front wheel of said bike and locked thereto by one respective said third locking device.

2. The vehicle bike rack as claimed in claim 1, wherein each said upper mounting block comprises a transverse mounting hole attached onto said first longitudinal rod or said second longitudinal rod of said U-shaped frame, a bottom pivot hole located on a bottom side thereof, and a second transverse mounting hole disposed in communication with said bottom pivot hole; each said lower mounting block comprises a top pivot portion pivotally connected to said bottom pivot hole of one respective said upper mounting block by a pivot for allowing rotation of said lower mounting block relative to the respective said upper mounting block, and an axial mounting hole attached onto said mounting rod of the respective said front wheel clamp for allowing said mounting rod of the respective said front wheel clamp to be moved forward or backward relative to the respective said lower mounting block.

3. The vehicle bike rack as claimed in claim 1, wherein said U-shaped clamping plate of said front wheel clamp has two pins bilaterally protruded from an inner wall thereof and aimed at each other; said third locking device is an elastic member, having two rows of mounting holes symmetrically arranged at two opposite sides for the mounting of said pins of said U-shaped clamping plate of the respective said front wheel clamp selectively.

4. The vehicle bike rack as claimed in claim 1, wherein said U-shaped clamping plate of each said front wheel clamp has two insertion slots symmetrically located on two opposite ends thereof; said third locking device is a hook-and-loop fastener with hook and loop fastening materials inserted through said insertion slots of said U-shaped clamping plate of the respective said front wheel clamp and then fastened up.

* * * * *